(12) United States Patent
Martena

(10) Patent No.: US 12,636,687 B2
(45) Date of Patent: May 26, 2026

(54) APPARATUS AND METHOD FOR REMOVING RUBBER

(71) Applicant: ELECTRONIC SYSTEMS S.P.A., Momo Novara (IT)

(72) Inventor: Florinda Martena, Momo Novara (IT)

(73) Assignee: ELECTRONIC SYSTEMS S.P.A., Momo Novara (IT)

( * ) Notice: Subject to any disclaimer, the term of this patent is extended or adjusted under 35 U.S.C. 154(b) by 879 days.

(21) Appl. No.: 17/626,392

(22) PCT Filed: Sep. 25, 2020

(86) PCT No.: PCT/EP2020/076873
§ 371 (c)(1),
(2) Date: Jan. 11, 2022

(87) PCT Pub. No.: WO2021/058724
PCT Pub. Date: Apr. 1, 2021

(65) Prior Publication Data
US 2022/0274144 A1 Sep. 1, 2022

(30) Foreign Application Priority Data
Sep. 27, 2019 (EP) .................................... 19200217

(51) Int. Cl.
B09B 3/50 (2022.01)
B09B 3/35 (2022.01)
B24B 49/10 (2006.01)

(52) U.S. Cl.
CPC .................. B09B 3/50 (2022.01); B09B 3/35 (2022.01); B24B 49/10 (2013.01); Y10T 29/49815 (2015.01)

(58) Field of Classification Search
CPC .... B09B 3/50; B09B 3/35; B09B 3/00; B09B 5/00; B24B 49/10; Y10T 29/49815; Y02W 30/62
See application file for complete search history.

(56) References Cited

U.S. PATENT DOCUMENTS

| | | | | |
|---|---|---|---|---|
| 5,904,305 A | * | 5/1999 | Kaczmarek | ............. B02C 23/10 |
| | | | | 241/DIG. 31 |
| 6,387,966 B1 | * | 5/2002 | Goldshtein | ......... B29B 17/0404 |
| | | | | 521/43.5 |

(Continued)

FOREIGN PATENT DOCUMENTS

| | | | | | |
|---|---|---|---|---|---|
| CN | 109111550 A | * | 1/2019 | | |
| CN | 109176967 A | * | 1/2019 | ............. | B29B 17/00 |

(Continued)

OTHER PUBLICATIONS

International Search Report and Written Opinion for International Patent Application PCT/EP/2020/076873.

(Continued)

*Primary Examiner* — Bayan Salone
(74) *Attorney, Agent, or Firm* — Simpson & Simpson, PLLC; Jeffrey B. Powers

(57) ABSTRACT

The invention provides an apparatus for removing rubber from a rubber component, preferably a rubber tire, wherein the rubber component comprises an outer rubber layer on top of textile components. The apparatus comprises a sensor configured to transmit an electromagnetic signal with a terahertz frequency onto the rubber component, to receive an electromagnetic signal refracted or reflected at the rubber component, and to determine the thickness of the outer rubber layer on top of the textile components based on the received electromagnetic signal and a remover device configured to remove the rubber from the outer rubber layer (Continued)

based on the determined thickness of the outer rubber layer on top of the textile components.

8 Claims, 5 Drawing Sheets

(56)                    References Cited

U.S. PATENT DOCUMENTS

| 8,357,026 | B2 * | 1/2013 | Manuel | B26D 3/005 |
| | | | | 451/49 |
| 8,876,511 | B2 * | 11/2014 | Yamane | B02C 18/148 |
| | | | | 264/141 |
| 11,060,859 | B2 * | 7/2021 | Saeedkia | G01B 11/0625 |
| 2005/0006813 | A1 | 1/2005 | Yamane et al. | |
| 2010/0130099 | A1 * | 5/2010 | Manuel | B26D 3/005 |
| | | | | 451/8 |
| 2016/0047753 | A1 * | 2/2016 | Huber | G01N 21/59 |
| | | | | 250/341.1 |
| 2017/0211158 | A1 * | 7/2017 | Staedler | C12P 5/007 |
| 2019/0041200 | A1 | 2/2019 | Saeedkia | |

FOREIGN PATENT DOCUMENTS

| CN | 109867836 | A | * | 6/2019 | |
| EP | 1458536 | A1 | | 9/2004 | |
| EP | 1458536 | B1 | * | 2/2008 | B29B 7/007 |
| EP | 1955842 | A1 | * | 8/2008 | G02B 1/043 |
| EP | 1955843 | A1 | * | 8/2008 | B24B 49/04 |
| EP | 2985585 | A1 | * | 2/2016 | G01M 17/02 |
| EP | 317628 | A1 | | 6/2017 | |
| JP | 2001301411 | A | * | 10/2001 | |
| JP | 2008001017 | A | * | 1/2008 | |
| WO | 98/09792 | A1 | | 3/1998 | |
| WO | 2003/051596 | A1 | | 6/2003 | |
| WO | WO-03051596 | A1 | * | 6/2003 | B29B 7/007 |
| WO | WO-2008121141 | A1 | * | 10/2008 | B26D 3/005 |
| WO | WO-2014042510 | A1 | * | 3/2014 | B01J 8/087 |

OTHER PUBLICATIONS

Extended European Search Report for EP19200228.5 (mailed Apr. 22, 2020).
Pending claims from Applicant's co-pending U.S. Appl. No. 17/626,375—Preliminary Amendment; Pending as of Jan. 11, 2022.
Westco ZBEC Accelerator; https://web.archive.org/web/20171022231121/https://wrchem.com/product/westco-cbs/ (Year: 2017).
Westco CBS Accelerator; https://web.archive.org/web/20171022231121/https://wrchem.com/product/westco-cbs/ (Year: 2017).
Pending claims from Applicant's co-pending U.S. Appl. No. 17/626,343—Preliminary Amendment; Pending as of Jan. 11, 2022.
Extended European Search Report for EP19200217.8 (mailed Mar. 12, 2020).

* cited by examiner

<u>1</u>

<u>1</u>

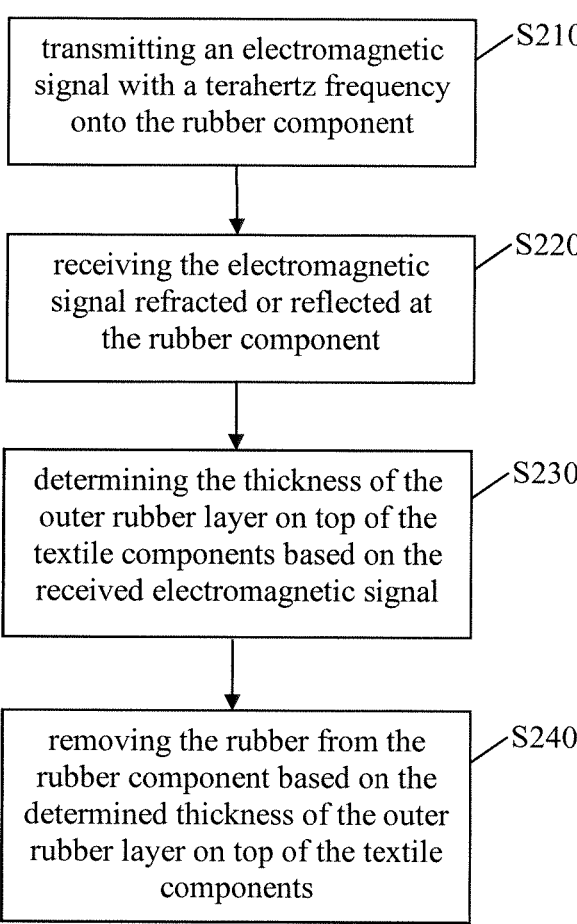

transmitting an electromagnetic signal with a terahertz frequency onto the rubber component ⟋S210 receiving the electromagnetic signal refracted or reflected at the rubber component ⟋S220 determining the thickness of the outer rubber layer on top of the textile components based on the received electromagnetic signal ⟋S230 removing the rubber from the rubber component based on the determined thickness of the outer rubber layer on top of the textile components ⟋S240

Fig. 6
<u>400</u>
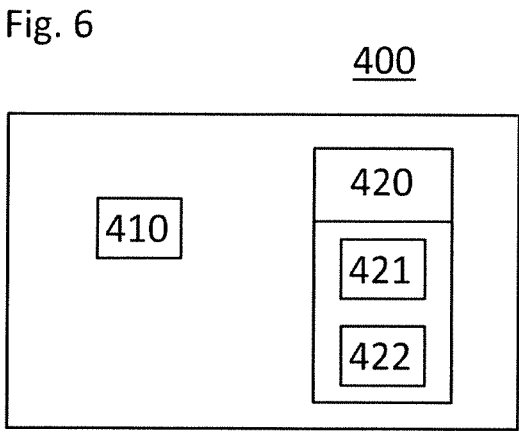
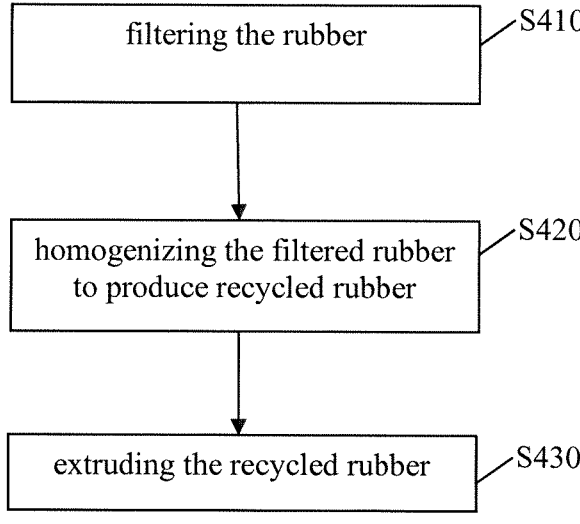
Fig. 7

APPARATUS AND METHOD FOR REMOVING RUBBER

REFERENCE TO RELATED APPLICATION

This application is a U.S. National Stage filing of International Application PCT/EP2020/076873, filed Sep. 25, 2020, which claims benefit of priority of European Patent Application Number 19200217.8, filed on Sep. 27, 2019, each of which is hereby incorporated by reference herein in its entirety.

The present disclosure generally relates to apparatus and methods for removing rubber from a rubber component, preferably a rubber tire, which comprises an outer rubber layer on top of textile components. The present disclosure further relates to a system and method for recycling of the removed rubber.

In prior art systems used rubber components, such as end-of-life tires (ELTs) are shredded. Since the ELTs contain metallic and textile components in addition to rubber, the prior art processes produce an impure material (rubber+metallic+textile) as output. In particular, textile components (textile cords) cannot be divided from the rubber. This leads to the problem that the shredded used rubber components cannot be de-vulcanised, because the presence of those impurities inhibits the cracking of the cross-links, e.g. Sulphur links of the rubber. Furthermore, since the rubber is not de-vulcanised and contains impurities, the use of such recycled rubber components is very limited.

Systems for reworking of rubber, e.g. rubber production waste, according to the prior art, comprised of a first mixer or cracking mill which is used to soften the rubber. Afterwards the rubber is homogenised in a second mixer or mill station. Disadvantagesouly, those reworking systems imply a big consumption of energy and footprint, due to the need of several mill stations. Furthermore, those reworking systems can only rework non-vulcanised rubber.

WO 2008/121141 A1 relates to a method and apparatus for buffing tread from a tire carcass. The method comprises the steps of determining a distance between a sensor and a belt of the tire and buffing tread from the tire until the distance between the sensor and the belt reaches a final distance.

EP 1 955 842 A1 relates to a grinding device with an eddy current sensor that detects a distance from the eddy current sensor to an outer peripheral surface of a belt layer in order to determine an eccentricity amount and an eccentricity direction of the tire to be retreaded with respect to a device axial center, when the tire is rotated during grinding. A carriage causes a rasp to be moved in a radial direction with respect to the tire and the rasp grinds a tread surface of the rotating tire to be retreaded.

EP 2 985 585 A1 relates to a method of testing a tire by applying electromagnetic radiation in the THz frequency range and evaluating the received reflections.

JP 2008 001017 A relates to a rubber thickness correcting method of a buff processing base tire for a regenerated tire in order to remove irregularities of a residual rubber thickness in the peripheral direction of a tire in a short time regardless of the presence of the axial shift between the tire and the rim, when the tire is rotated.

US 2019/041200 A1 relates to methods for measuring thickness of individual layers in multi-layer structures using terahertz waves.

It is an object of the present invention to overcome the above mentioned problems of the related art. In particular, it is an object of the present invention to provide an apparatus and a method which provide high quality reusable rubber from rubber components. It is a further object of the present invention to provide an apparatus and a method with a small footprint and low energy consumption.

The above-mentioned objects are achieved with the features of the independent claims. Dependent claims define preferred embodiments of the invention.

In particular, according to the present invention, an apparatus for removing rubber from a rubber component, preferably a rubber tire having an outer rubber layer on top of textile components, comprises a sensor configured to transmit an electromagnetic signal with a terahertz frequency onto the rubber component, to receive an electromagnetic signal refracted or reflected at the rubber component, and to determine the thickness of the outer rubber layer on top of the textile components based on the received electromagnetic signal. The apparatus for removing rubber from a rubber component furthermore comprises a remover device configured to remove the rubber from the outer rubber layer based on the determined thickness of the outer rubber layer on top of the textile components.

Preferably, the sensor comprises a transmitter disposed on one side of the rubber component and configured to emit the electromagnetic signal towards the rubber component, and a receiver disposed at another side of the rubber component and configured to receive the electromagnetic signal refracted at the rubber component or a receiver disposed at the one side, i.e. the same side as the transmitter, of the rubber component and configured to receive the electromagnetic signal reflected at the rubber component.

The terahertz frequency may be between 0.3 and 30 THz, preferably between 0.3 and 10 THz, more preferably between 0.3 and 6 THz and most preferably between 0.3 and 3 THz.

The remover device is preferably configured to remove the rubber until a residual thickness of the outer rubber layer of 1 mm, preferably 600 µm, more preferably 300 µm.

The sensor is preferably configured to evaluate refraction or reflection peaks in the received electromagnetic signal by performing a time-domain analysis to determine the thickness of the outer rubber layer on top of the textile components.

Also preferably, the sensor is configured to continuously determine the thickness of the outer rubber layer on top of the textile components during removing and to cause the remover device to stop removing if the determined thickness of the outer rubber layer is below a predetermined threshold.

The predetermined threshold may be 1 mm, preferably 600 µm, more preferably 300 µm.

Furthermore, the remover device may comprises a rotor having at least one blade (flight) and one support hub.

Preferably, the at least one blade is detachably mounted on the support hub.

Preferably, the least one blade is a stainless steel disk with a plurality of cutting teeth along an outer circumferential surface thereof.

Preferably, the at least one stainless steel disk is configured to be removably clamped onto the support hub, preferably by conical inserts.

The at least one blade is preferably provided in plurality of two, three, four, five or more.

Preferably the distance between the blades is between 21 and 2 mm, preferably between 18 and 4 mm, more preferably between 10 and 4 mm, and most preferably about 6 mm. Preferably, the number of blades is between 2 to 25, preferably 5 to 20, more preferably 5-15, even more preferably 5-10 and most preferably 10.

The apparatus of the present invention preferably further comprises a positioning system configured to position the rotor with respect to the outer circumferential surface of the rubber component, based on the determined thickness of the outer rubber layer on top of the textile components.

According to another aspect, the present invention provides a system for recycling of non-vulcanised rubber or de-vulcanised rubber of a rubber component, preferably a rubber tire. The system comprises an apparatus for removing rubber from the rubber component, as explained above, and a reworking apparatus configured to produce recycled rubber, preferably using the removed rubber.

Preferably, the system further comprises an apparatus for de-vulcanisation of the rubber, preferably the removed from the rubber component.

According to another aspect, the present invention provides a method for removing rubber from a rubber component, preferably a rubber tire, having textile components, wherein the rubber component comprises an outer rubber layer on top of textile components. The method comprises the steps of transmitting an electromagnetic signal with a terahertz frequency onto the rubber component, receiving the electromagnetic signal refracted or reflected at the rubber component, determining the thickness of the outer rubber layer on top of the textile components based on the received electromagnetic signal, and removing the rubber from the rubber component based on the determined thickness of the outer rubber layer on top of the textile components.

The terahertz frequency may be between 0.3 and 30 THz, preferably between 0.3 and 10 THz, more preferably between 0.3 and 6 THz and most preferably between 0.3 and 3 THz.

The removing of the rubber may comprise removing the rubber until a residual thickness of the outer rubber layer of 1 mm, preferably 600 μm, more preferably 300 μm is reached.

Preferably, the step of determining the thickness of the outer rubber layer on top of the textile components may comprise evaluating refraction or reflection peaks in the received electromagnetic signal by performing a time-domain analysis.

The step of determining the thickness of the outer rubber layer on top of the textile components preferably comprises a continuous determination of the thickness of the outer rubber layer on top of the textile components during removing and stopping the removing if the determined thickness of the outer rubber layer is below a predetermined threshold.

The predetermined threshold may be 1 mm, preferably 600 μm, more preferably 300 μm.

Preferably, the step of removing the rubber from the rubber component comprises removing only the rubber from the rubber component.

According to another aspect, the present invention provides a method for recycling of non-vulcanised or de-vulcanised rubber from a rubber component, preferably a rubber tire. The method comprises a method for removing rubber as described above, and a method for reworking the rubber to produce recycled rubber, preferably using the removed rubber.

Preferably, the method comprises a method for de-vulcanisation of rubber, preferably the removed rubber from the rubber component.

In general, the present invention aims at realizing an innovative process for recycling rubber, preferably used rubber or rubber production waste, e.g. in the tire industry. The process is a sequence of mechanical and/or chemical operations implemented by a compact dedicated recycling line to be implemented in two versions that apply to different phases of the rubber lifecycle as follows:

REWORK: the rework relates to tire production, i.e. to rework all scraps and non-compliant components and produce rubber 100% reusable for producing new rubber products.

RECYCLE: the recycle process relates to recovering rubber from end-of-life tires (ELT) or any used rubber components to produce sheeted rubber usable for molded applications, which includes pre-conditioning phases to clear rubber from textile cords.

The above mentioned rework may be a part of the overall recycle process.

The recycle process may be sub-divided into the following operations and related machines: a) Removing of rubber. This may be done by peeling or scrapping the rubber from rubber components, e.g. from ELTs, to produce rubber chips; b) De-vulcanisation of vulcanized rubber. The rubber chips may be fed into an autoclave and subsequently into a mixer to produce rubber strips; c) Reworking of the rubber strips. The rubber strips may be fed into a cutting unit and subsequently into a gear pump and a mixer-extruder to produce reworked rubber.

In other words, the above mentioned recycling is an innovative process for recycling of rubber production waste or post-consumer rubber components. This process may be made of three phases: 1. Peeling rubber chips from the rubber component: peeling is performed by a rotor with milling knives that rotate against the rubber component and grate the surface to produce rubber chips. 2. Cleaning and sanitization of the rubber chips. 3. Mixing rubber chips with additives to crack the cross links, e.g. Sulphur links.

The present invention allows to divide rubber completely from other materials of the tires. By combining a peeler (remover device) grates rubber chips from ELT and is driven by a THz sensor, that can measure through the rubber and any textile layers and steel cords. Thus, enabling the rotation and grating of the peeler to stop before the textile and/or steel cords are reached, e.g. at a residual depth of rubber below 300 microns.

The rotor may have a configuration where the milling knives are separate components that can easily be mounted and dismounted from a supporting hub. Since the knives are subjected to wear and need to be periodically replaced, this solution facilitates maintenance.

As described above, the knives may be stainless steel disks with many teeth that are clamped to the supporting hub by conical inserts. With this solution, only the disk/knives, made of high-performance steel, must be replaced when teeth are worn off.

The optimal pitch, as described above, between the disk/knives is also a parameter which is appropriately selected. The grooves between the disks are the channels where the rubber chips are dragged away of the formation spot. Their dimension determines the capacity to drag away the chips that are quite non-uniform in terms of dimension and physical properties being obtained from end-of-life rubber.

The higher the number of disks the higher the capacity of the machine to remove rubber per single rotation pass. Conversely, the higher the disks, the shorter the pitch among them, a factor that increases lateral friction with the ELT and consequent heating, with the risk of deteriorating the properties of the rubber chips. The final optimization of the present invention as described herein is a trade-off between those considerations.

The rotor may be commanded by an electric motor that maintains a constant rotational speed and supports the resisting torque generated by the friction with the ELT. The rotor may also be commanded by a positioning system that performs three main functions: a.) placing the rotor in the correct position with respect to the ELT and moving it back when peeling operations are finished; b.) keeping the position of the rotor during operations by supporting the forces generated at the contact between the knives and the ELT; and c.) advancing the rotor with respect to the ELT depending on the progress of the peeling operation and upon command of the THz sensor that measures the residual depth of the rubber (i.e. the distance of the knives from the underlying textile cords) and stops the process when the threshold distance is reached.

A configuration with two independent and overlying actuation systems for the X- and Y-axes may preferably be used.

The screw balls may be used as actuators only while tubular guides are introduced to support reaction forces and increase stiffness.

The components may include an electric motor that commands rotation of the peeling rotor, a stepper motor that commands positioning of the peeling rotor, pneumatic actuators for the drum, a machine cabinet and an operator panel.

System integration may include mechanical structures, supporting structure for the THz sensor and a metallic cage to protect the operator. Moreover, system integration may also include electrical wiring, control and command software, and PLC/HMI programming.

As described above, a de-vulcanisation process may follow the peeler and the autoclave for performing de-vulcanization of rubber and conditioning of the rubber chips before entering the gear pump (rework process).

According to the invention de-vulcanizing post-consumer rubber is provided. This process may comprise two main phases: a. cleaning and sanitization of rubber to be de-vulcanised, e.g. post-consumer rubber chips and b. mixing rubber chips with additives to crack the cross links, e.g. Sulphur links of the rubber.

De-vulcanizing rubber may be provided by using a mechanical-chemical process that applies very high mechanical stress, preferably tangential stresses on the rubber to be de-vulcanised together with at least one chemical additive.

In view of the aforementioned autoclave, a steam unit to clean and sanitize the rubber chips produced by the peeler may be provided before the rubber is fed to the mixer.

In view of the aforementioned mixer, a machine with tangential rotors to maximize the strain on the rubber chips so that they are subjected to a strong thermo-mechanical action suitable to break the cross links, e.g. Sulphur links, and achieve de-vulcanization may be provided.

Rubber strips may be obtained by the mixer and fed into the rework line to be conditioned. The rework line may be made by a gear pump and a mixer-extruder.

A screw (scroll) may installed before the gear pump to introduce the rubber strips into the machine. The gear pump may be fed by cold rubber and may have the function of filtering rubber coining out from mixer.

The mixer-extruder may integrate a mixer and an extruder head. The mixer-extruder may integrate in a single machine following the functions: cracking, homogenizing, and extruding.

In other words, the present invention provides a sequence of mechanical operations implemented by a compact dedicated line that reworks all type of rubber scraps and non-compliant intermediate components from, for example, tire production and produces rubber that is 100% reusable in the main production process, i.e. for producing new rubber products such as rubber tires.

The reworking is provided to serve, for example, tire-manufacturing plants and the design solutions adopted are optimized to facilitate installation into the typical production contexts.

The main benefits comprise the complete internal recycling of all non-compliant components and the increase of the yield of the production plant thus improving eco-efficiency and reducing variable costs.

The rework apparatus may comprise two main machines, i.e. a gear pump and a mixer-extruder, complemented by auxiliary units (pusher, conveyors, hatcher, stretching and cooling unit) to form the integrated line.

The rework apparatus may be operated close to the tire production machines in order to process the non-compliant components without stopping the main production line.

The rework apparatus may have a capacity of 2,5 to 5,0 t/h. The main technical functions of the rework apparatus may be as followings:

filtering/straining non-compliant and contaminated components such as threads, cap strips, innerliners and sidewalls, cleaning the components from scorch and other contaminants, and re-milling the components to produce rubber sheets reusable in production.

For the tire manufacturing process, the rework apparatus may generate performance gains as follows:

recycling the non-compliant components without stopping tire production generates more yield from the same plant capacity, recycling non-compliant components allows increasing speed of production process, recycling all the non-compliant components generates multiple savings (materials, energy, costs), thus improving profitability and environmental footprint.

The rework apparatus features important improvements with respect to prior art, made by multiple mill stations, which may be:

re-mills and cleans the rubber compound in one step, re-mills and softens rubber without a mixing line thus reducing footprint, reduces power consumption for the same capacity, produces semi-finished rubber in sheets that can be stored in pallets (thus reducing the space needed in the manufacturing plant), moved automatically (thus reducing manual operations) and more easily weighted on-line.

With the present invention the footprint can be reduced by 60%, mainly through the replacement of the three mills of the baseline rework by the mix-extruder, the capacity of the gear pump has been quadrupled up to 5 t/h, and the power installed has been lowered from 1.097 kW to 370 kW, compared with prior art.

BRIEF DESCRIPTION OF THE FIGURES

FIG. 3 is a flow chart of a method for removing rubber according to the present invention.

FIG. 6 is a schematic illustration of an apparatus for reworking of rubber according to the present invention.

FIG. 7 is a flow chart of a method for reworking of rubber according to the present invention.

FIG. 1a schematically shows a system 1 for recycling of non-vulcanised rubber or de-vulcanised rubber of a rubber component, preferably a rubber tire. The system 1 comprises an apparatus 200 for removing rubber from the rubber component and a reworking apparatus 400 configured to produce recycled rubber from the non-vulcanised or de-vulcanised rubber. As shown in FIG. 1b, the system preferably further comprises an apparatus 300 for de-vulcanisation of the rubber removed from the rubber component. The apparatus 300 for de-vulcanisation of the rubber is configured to de-vulcanise the rubber removed from the rubber component.

In general, the reworking apparatus 400 can be fed with de-vulcanised rubber, which has been de-vulcanised by the apparatus 300 for de-vulcanisation, or with rubber that has not been vulcanized before and thus not been de-vulcanised by the apparatus 300 for de-vulcanisation.

The above mentioned apparatus 200, 300, 400 of the system 1 are next described separately in more detail. However, the below description of the individual apparatus 200, 300, 400 apply to the apparatus 200, 300, 400 in the system 1 for recycling of non-vulcanised rubber or de-vulcanised rubber of a rubber component.

The methods described herein may also be combined in the same manner as the apparatus. That is, the methods relating to removing, de-vulcanisation, and reworking may be combined to one method, wherein the de-vulcanisation method is optional, because it is only needed for recycling of vulcanized rubber.

Removing Apparatus

Figures 1A, 1B:
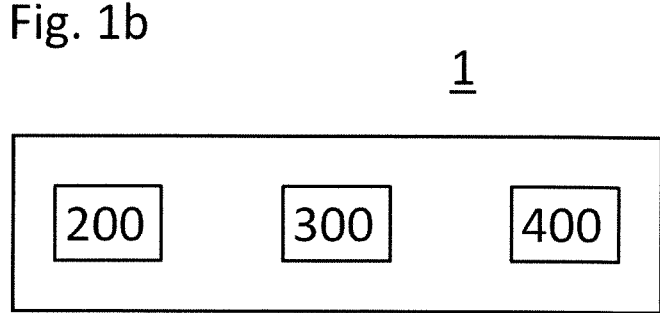
FIG. 1*a* is a schematic illustration of a system for recycling of rubber from a rubber component according to the present invention.
FIG. 1*b* is a schematic illustration of a system for recycling of rubber from a rubber component according to another aspect of the present invention.
Figure 2:
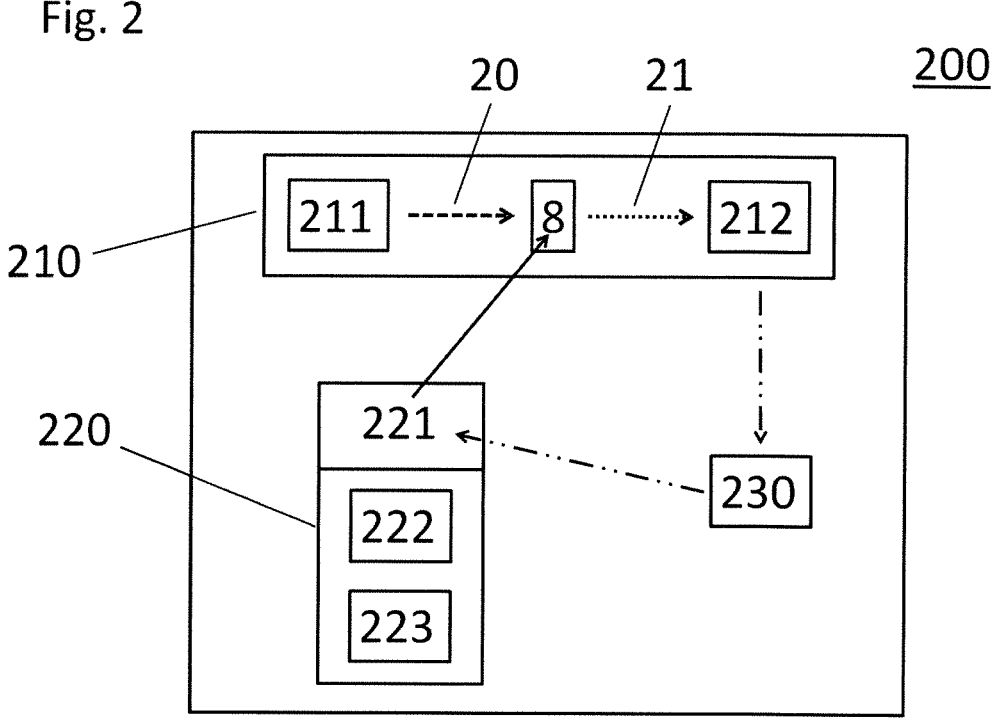
FIG. 2 is a schematic illustration of an apparatus for removing rubber from a rubber component according to the present invention.

FIG. 2 schematically shows an apparatus 200 for removing rubber from a rubber component 8, preferably a rubber tire having an outer rubber layer on top of textile components, according to the present invention.

As shown in FIG. 2, the apparatus 200 comprises a sensor 210 configured to transmit an electromagnetic signal 20 with a terahertz frequency onto the rubber component 8, to receive an electromagnetic signal 21 refracted or reflected at the rubber component 8, and to determine the thickness of the outer rubber layer on top of the textile components based on the received electromagnetic signal. The apparatus 200 furthermore comprises a remover device 220 configured to remove the rubber from the outer rubber layer based on the determined thickness of the outer rubber layer on top of the textile components.

The sensor 210 comprises a transmitter 211 disposed on one side of the rubber component 8 and configured to emit the electromagnetic signal 20 towards the rubber component 8, and a receiver 212 disposed at another side of the rubber component 8 and configured to receive the electromagnetic signal 21 refracted at the rubber component 8.

Alternatively, the sensor 210 comprises a transmitter 211 disposed on one side of the rubber component 8 and configured to emit the electromagnetic signal 20 towards the rubber component 8, and a receiver (not shown) disposed at the same side as the transmitter 211 of the rubber component 8 and configured to receive the electromagnetic signal 21 reflected at the rubber component 8.

The terahertz frequency is between 0.3 and 30 THz, preferably between 0.3 and 10 THz, more preferably between 0.3 and 6 THz and most preferably between 0.3 and 3 THz.

The remover device 220 is configured to remove the rubber until a residual thickness of the outer rubber layer of 1 mm, preferably 600 μm, more preferably 300 μm.

The sensor 210 is configured to evaluate refraction or reflection peaks in the received electromagnetic signal by performing a time-domain analysis to determine the thickness of the outer rubber layer on top of the textile components. Also, the sensor 210 is configured to continuously determine the thickness of the outer rubber layer on top of the textile components during removing and to cause the remover device 220 to stop removing if the determined thickness of the outer rubber layer is below a predetermined threshold.

The predetermined threshold is 1 mm, preferably 600 μm, more preferably 300 μm.

Furthermore, the remover device 220 comprises a rotor 221 having at least one blade 222 and one support hub 223. The at least one blade 222 is detachably mounted on the support hub 223. The least one blade 222 may be a stainless steel disk with a plurality of cutting teeth along an outer circumferential surface thereof.

The at least one stainless steel disk is configured to be removably clamped onto the support hub 223, preferably by conical inserts.

The at least one blade is provided in plurality of two, three, four, five or more. The distance between the blades is between 21 and 2 mm, preferably between 18 and 4 mm, more preferably between 10 and 4 mm, and most preferably about 6 mm. The number of blades is between 2 to 25, preferably 5 to 20, more preferably 5-15, even more preferably 5-10 and most preferably 10.

The apparatus 200 of the present invention preferably further comprises a positioning system 230 configured to position the rotor 221 with respect to the outer circumferential surface of the rubber component, based on the determined thickness of the outer rubber layer on top of the textile components.

Figure 2A:
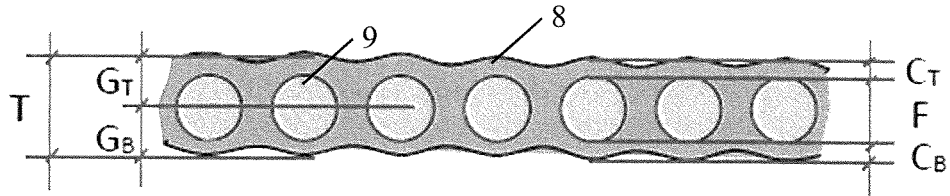
FIG. 2a is a schematic illustration of a rubber component with textile components therein.

FIG. 2a shows a schematic illustration of a rubber component 8 with textile components 9 therein. In particular, with reference to FIG. 2a, the sensor 210 is described in more detail.

In general, a characteristic of the waves in the THz frequency band is their interaction with the structure and composition of materials. Using this characteristic, it is then possible to obtain information about the internal structure of a sheet of material by analyzing the behavior of the electromagnetic beam when it crosses that sheet.

According to certain embodiments of the present invention it is preferred to precisely measure the overall thickness and the relative position of the internal textile cords 9 within the rubber component 8.

In FIG. 2a, CT indicates the average top coating thickness, CB indicates the average bottom coating thickness, F indicates the fabric cord thickness, T indicates the overall sheet thickness (T*=CT+F+CB calculated total thickness), GT indicates the distance from the top of the center of gravity of the net, and GB indicates the distance from the bottom of the center of gravity of the net.

The measurement system (sensor 210) is based on the properties of electromagnetic waves that, when passing through a sheet of material, may be partially refracted (a variation in the reflection index is detected).

For example, a transmitter antenna sends a sequence of electromagnetic pulses that are focused as a beam on the surface of the sample to be measured through a set of lenses.

Considering the multilayer structure of rubberized fabric as illustrated in FIG. 2*a*, several refractions are expected to take place along the path of the beam, in particular at the following transitions/interfaces: between the air and the rubberized surface (entering into the sheet), between the rubber and the textile cord (inside the sheet on one side), between the textile cord and the rubber (inside the sheet on the other side), and between the rubberized surface and the air (coming out of the sheet).

Due to the various refractions, a receiver antenna captures pulses having covered different distances. Through a special time-domain analysis of the peaks of the signals, this information is used to estimate the thickness of materials.

The relationship between time (t), the thickness of the sample to be measured (D) and the reflection index (n) is expressed by the following formula, where v and c represent the speeds of the electromagnetic wave in the material and vacuum respectively:

$$D = v \cdot t = \frac{c}{n} \cdot t$$

FIG. 3 shows a flow chart of a method for removing rubber from a rubber component, preferably a rubber tire, having textile components, wherein the rubber component comprises an outer rubber layer on top of textile components.

The method comprises the steps of S210 transmitting an electromagnetic signal with a terahertz frequency onto the rubber component, S220 receiving the electromagnetic signal refracted or reflected at the rubber component, S230 determining the thickness of the outer rubber layer on top of the textile components based on the received electromagnetic signal, and S240 removing the rubber from the rubber component based on the determined thickness of the outer rubber layer on top of the textile components.

De-Vulcanisation Apparatus

Figure 4:
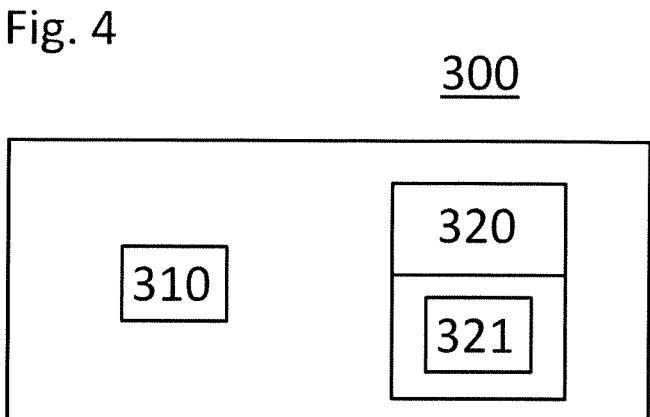
FIG. 4 is a schematic illustration of an apparatus for de-vulcanisation of rubber according to the present invention.

According to another aspect, the present invention provides an apparatus 300 for de-vulcanisation of rubber from a rubber component 8. The rubber component 8 can be e.g. used rubber tires and/or rubber production waste. As schematically shown in FIG. 4, the apparatus 300 includes a cleaning device 310 configured to clean and/or sanitize rubber and a mixing device 320 having at least one rotor 321, configured to de-vulcanise the cleaned and/or sanitized rubber.

According to this embodiment the cleaning device is an autoclave. The cleaning device 310 is configured to clean and/or sanitize the rubber by applying heat and/or pressure to the rubber. The heat can be in a temperature range between 80 and 180 degree Celsius. Preferably the heat is in a range of 100 to 120 degree Celsius.

The pressure can be in a range between atmospheric pressure and 5.0 bar. Preferably the pressure is in a range between atmospheric pressure and 2.7 bar.

The at least one rotor 321 of the mixing device 320 has at least one blade which is configured to apply mechanical stress to the cleaned and/or sanitized rubber to de-vulcanise the cleaned and/or sanitized rubber. The blade is configured to apply the mechanical stress to the cleaned and/or sanitized rubber in a substantially tangential direction. The at least one rotor 321 has four blades. Preferably, two of the four blades are configured to apply the mechanical stress to the rubber, while the two other blades of the rotor 321 are smaller and configured to support mixing of materials/substances.

Beyond that, the mixing device 320 is further configured to add at least one chemical additive to the cleaned and/or sanitized rubber which aids breaking the cross-links of the cleaned and/or sanitized rubber. Preferably, the at least one chemical additive is a de-vulcanisation agent. The de-vulcanisation agent represents between 1% and 15% of the weight of the cleaned and/or sanitized rubber and is suitable to aid breaking cross-links of the cleaned and/or sanitized rubber. Preferably the de-vulcanisation agent represents 5% of the weight of the cleaned and/or sanitized rubber. Preferably, the two smaller blades of the rotor 321 enable a homogeneous mixing of the chemical additive and the rubber.

Figure 5:
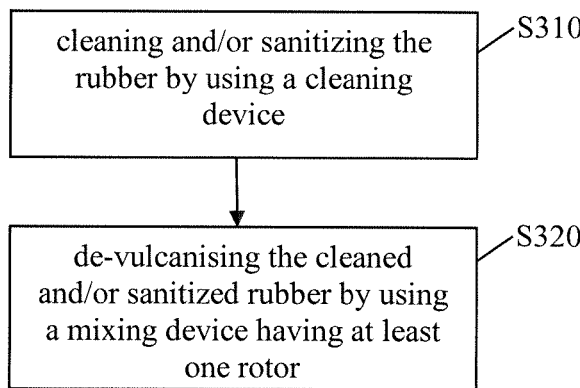
FIG. 5 is a flow chart of a method for de-vulcanisation of rubber according to the present invention.

FIG. 5 shows a flow chart of a method for de-vulcanisation of rubber. In particular, FIG. 5 shows a method for de-vulcanisation of rubber from a rubber component. The rubber component can be, e.g. a used rubber tire and/or rubber production waste. The method comprises S310 cleaning and/or sanitizing the rubber by using a cleaning device and S320 de-vulcanising the cleaned and/or sanitized rubber by using a mixing device having at least one rotor 321, as mentioned before.

Reworking Apparatus

FIG. 6 illustrates an apparatus 400 for reworking of non-vulcanised rubber or de-vulcanied rubber from a rubber component. The rubber component 8 can be e.g. used rubber tires and/or rubber production waste. As schematically shown in FIG. 6 the apparatus 400 comprises a gear pump 410 configured to receive and filter the rubber to produce filtered rubber, and a mixer-extruder 420 configured to homogenize and extrude the filtered rubber to produce recycled rubber.

The gear pump 410 comprises at least one mesh or grid at its output which is configured to filter inhomogenities, e.g. scortches, dirt, impurities, grains etc. The mixer-extruder 420 comprises a mixer 421. The mixer 421 is configured to add to the rubber at least one element of the group consisting of: additives, fillers, polymers, plasticizers or activators. Preferably, the mixer 421 is also configured to add to the rubber at least one accelerator and at least one crosslinker to produce recycled rubber. Preferably, the accelerator is at least one of CBS and ZBEC. Preferably, the crosslinker is sulphur 95%.

The mixer-extruder 420 preferably comprises an extruder head 422 configured to extrude the recycled rubber. The extruder head 422 is coupled to the output end of the mixer-extruder 420. The extruder head 422 may also be coupled directly to the mixer-extruder 420, such that no means for transportation, e.g. conveyors, or other output means, e.g. sheeting mills, are necessary.

FIG. 7 illustrates a flow chart of a method for reworking non-vulcanised rubber or de-vulcanised rubber from a rubber component, preferably a rubber tire, to produce and extrude recycled rubber. The method comprises the steps of S410 filtering the rubber, S420 homogenizing the filtered rubber to produce recycled rubber, and S430 extruding the recycled rubber.

The step of homogenizing the rubber comprises the step of adding to the rubber at least one element of the group consisting of: additives, fillers, polymers, plasticizers and activators.

Further, the step of homogenizing the rubber comprises the step of adding to the rubber at least one accelerator and at least one crosslinker. The accelerator preferably is at least one of CBS or ZBEC. The crosslinker is preferably sulphur 95%.

The system according to the present invention enables recycling of rubber, e.g. of rubber from used rubber components or rubber production waste. The recycled rubber is of high quality and has similar material properties as rubber produced from natural rubber.

This is achieved due to the process of removing the rubber with the aid of the apparatus for removing rubber, according to the present invention. In particular, only the rubber that covers the textile components of the rubber components is removed to be recycled. Therefore, the present application detects the position of the textile components via electromagnetic signals and stops the remover device, before the textile components are touched. Therefore, the removed material does not include textile or other non-rubber components, thereby avoiding inhomogeneities. With the apparatus for de-vulcanisation of rubber, according to the present invention, cleaned and sanitized rubber is produced as an intermediate product. This cleaned and sanitized rubber is de-vulcanised by the apparatus as of the present invention such that rubber which can be reprocessed is produced. Advantageously, this rubber does not contain non-rubber material, e.g. textile components.

The apparatus for reworking non-vulcanised rubber or de-vulcanied rubber enables to directly extrude recycled rubber, without the need of other extraction means. The recycled rubber is of high quality enabling a use in various contexts and fields.

The aforementioned features which may have been described solely with respect to the respective apparatus 200, 300, 400 apply to the respective methods as well. Their description in relation to the respective methods has simply be omitted to avoid any unnecessary repetitions.

As the present invention may be embodied in several forms without departing from the scope or essential characteristics thereof, it should be understood that the above-described embodiments are not limited by any of the details of the foregoing descriptions, unless otherwise specified, but rather should be construed broadly within the scope as defined in the appended claims, and therefore all changes and modifications that fall within the present invention are therefore intended to be embraced by the appended claims.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The present invention also relates to the following items:

1. Apparatus for de-vulcanisation of rubber from a rubber component, preferably a rubber tire, the apparatus comprising:
   a cleaning device configured to clean and/or sanitize the rubber; and
   a mixing device having at least one rotor configured to de-vulcanise the cleaned and/or sanitized rubber.
2. The apparatus of item 1, wherein the cleaning device is configured to clean and/or sanitize the rubber by applying heat and/or pressure to the rubber, wherein the heat is preferably in a range between 100 and 120 degree Celsius.
3. The apparatus of item 1 or 2, wherein the rotor has at least one blade which is configured to apply mechanical stress to the cleaned and/or sanitized rubber to de-vulcanise the cleaned and/or sanitized rubber.
4. The apparatus of item 3, wherein the blade is configured to apply the mechanical stress to the cleaned and/or sanitized rubber in a substantially tangential direction.
5. The apparatus of any one of items 1 to 4, wherein the mixing device is further configured to add at least one chemical additive to the cleaned and/or sanitized rubber,
   wherein the chemical additive is suitable to break the cross-links of the cleaned and/or sanitized rubber.
6. The apparatus of item 5, wherein the at least one chemical additive is a de-vulcanisation agent, preferably representing between 1% and 15% of the weight, preferably 5% of the weight, of the cleaned and/or sanitized rubber.
7. The apparatus of any one of items 1 to 6, wherein the cleaning device is an autoclave.
8. System for recycling of non-vulcanized rubber or de-vulcanized rubber from a rubber component, preferably a rubber tire, the system comprising:
   an apparatus for removing rubber from the rubber component;
   an apparatus for de-vulcanisation of the rubber, preferably the removed rubber, according to any one of items 1 to 7;
   an apparatus for reworking of non-vulcanised rubber or de-vulcanied rubber configured to produce recycled rubber comprising the non-vulcanised rubber and/or the de-vulcanised rubber.
9. A method for de-vulcanisation of rubber from a rubber component, preferably a rubber tire, the method comprising:
   cleaning and/or sanitizing the rubber by using a cleaning device; and
   de-vulcanising the cleaned and/or sanitized rubber by using a mixing device having at least one rotor.
10. The method of item 9, wherein cleaning and/or sanitizing the rubber comprises the application of heat and/or pressure thereon,
    wherein the heat is preferably in a range between 100 and 120 degree Celsius.
11. The method of item 9 or 10, wherein de-vulcanising comprises applying mechanical stress to the cleaned and/or sanitized rubber.
12. The method of item 11, wherein the mechanical stress is applied to the rubber in a substantially tangential direction.
13. The method of any one of items 9 to 12, wherein de-vulcanising comprises adding at least one chemical additive to the cleaned and/or sanitized rubber to break the cross-links of the cleaned and/or sanitized rubber, wherein the least one chemical additive is preferably a de-vulcanisation agent, and representing preferably between 1% and 15% of the weight, preferably 5% of the weight, of the cleaned and/or sanitized rubber and suitable to aid breaking cross-links of the cleaned and/or sanitized rubber.
14. A method for recycling of non-vulcanised rubber or de-vulcanised rubber from a rubber component, preferably a rubber tire, the method comprising:
    a method of removing rubber from a rubber component;

a method for de-vulcanisation of the rubber, preferably the removed rubber, to produce de-vulcanised rubber according to any one of items 9 to 13; and a method for reworking the rubber to produce recycled rubber.

15. Apparatus for reworking of non-vulcanised rubber or de-vulcanied rubber from a rubber component, preferably a rubber tire, to produce recycled rubber, the apparatus comprising:

a gear pump configured to receive and filter the rubber to produce filtered rubber; and a mixer-extruder configured to homogenize and extrude the filtered rubber to produce recycled rubber.

16. The apparatus of item 15, wherein the gear pump comprises at least one mesh or grid at its output which is configured to filter inhomogenities.

17. The apparatus of item 15 or 16, wherein the mixer-extruder comprises a mixer.

18. The apparatus of item 17, wherein the mixer is configured to:

add to the rubber at least one element of the group consisting of: additives, fillers, polymers, plasticizers or activators; and add to the rubber at least one accelerator and at least one crosslinker to produce recycled rubber.

19. The apparatus of item 18, wherein the accelerator is at least one of CBS and ZBEC, and the crosslinker is sulphur 95%.

20. The apparatus of any one of items 15 to 19, wherein the mixer-extruder comprises an extruder head configured to extrude the recycled rubber.

21. The apparatus of item 20, wherein the extruder head is coupled to an output end of the mixer-extruder.

22. System for recycling of non-vulcanised rubber or de-vulcanised rubber from a rubber component, preferably a rubber tire, the system comprising:

an apparatus for removing rubber from the rubber component; and an apparatus for reworking of non-vulcanised rubber or de-vulcanied rubber configured to produce recycled rubber according to any one of items 15 to 21.

23. The system of item 22, further comprising an apparatus for de-vulcanisation of rubber configured to de-vulcanise the rubber, preferably the removed rubber.

24. A method for reworking non-vulcanised rubber or de-vulcanised rubber from a rubber component, preferably a rubber tire, to produce and extrude recycled rubber, the method comprising:

filtering the rubber;

homogenizing the filtered rubber to produce recycled rubber; and extruding the recycled rubber.

25. The method of item 24, wherein homogenizing the rubber comprises the steps of:

adding to the rubber at least one element of the group consisting of: additives, fillers, polymers, plasticizers and activators; and adding to the rubber at least one accelerator and at least one crosslinker.

26. The method of item 25, wherein the accelerator is at least one of CBS and ZBEC; and the crosslinker is sulphur 95%.

27. A method for recycling of non-vulcanised rubber or de-vulcanised rubber from a rubber component, preferably a rubber tire, the method comprising:

a method of removing rubber from a rubber component; and a method for reworking the rubber to produce recycled rubber according to any one of items 24 to 26.

28. The method of item 27, further comprising a method for de-vulcanisation of rubber, preferably the removed rubber, to produce de-vulcanised rubber.

The invention claimed is:

1. A method for removing rubber from a rubber component having textile components, wherein the rubber component comprises an outer rubber layer on top of the textile components, the method comprising:

transmitting an electromagnetic signal with a terahertz frequency onto the rubber component;

receiving the electromagnetic signal refracted or reflected by the rubber component, the electromagnetic signal having peaks corresponding to at least an air-rubber interface, and a rubber-textile interface;

determining the thickness of the outer rubber layer based on peaks in the received electromagnetic signal; and removing the rubber from the rubber component based on the determined thickness of the outer rubber layer.

2. The method of claim 1, wherein the terahertz frequency is between 0.3 and 30 THz.

3. The method of claim 1, wherein the step of determining the thickness of the outer rubber layer on top of the textile components comprises evaluating the peaks in the received electromagnetic signal by performing a time-domain analysis.

4. The method of claim 1, wherein the step of determining the thickness of the outer rubber layer comprises continuously determining the thickness of the outer rubber layer during the step of removing and stopping the step of removing if the determined thickness of the outer rubber layer is below a predetermined threshold.

5. The method for removing rubber according to claim 1, further comprising reworking the rubber to produce recycled rubber.

6. The method of claim 5, further comprising de-vulcanising the rubber.

7. The apparatus of claim 4, wherein the predetermined threshold is equal to or less than 1 mm.

8. The method of claim 2, wherein the step of removing the rubber comprises removing the rubber until a residual thickness of the outer rubber layer is equal to or less than 1 mm.

* * * * *